United States Patent
Gould et al.

(10) Patent No.: US 10,469,336 B2
(45) Date of Patent: *Nov. 5, 2019

(54) COMMAND PERFORMANCE MONITORING (71) Applicant: VERISIGN, INC., Reston, VA (US)

(72) Inventors: James Gould, Leesburg, VA (US); Manish Kumar Maheshwari, Karnataka (IN); Sathyabodh Mudhol, Karnataka (IN)

(73) Assignee: VERISIGN, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/192,082

(22) Filed: Jun. 24, 2016

(65) Prior Publication Data

US 2016/0308736 A1 Oct. 20, 2016

Related U.S. Application Data (63) Continuation of application No. 14/320,599, filed on Jun. 30, 2014, now Pat. No. 9,380,019.

(51) Int. Cl.
*H04L 12/24* (2006.01)
*H04L 29/12* (2006.01)
(Continued)

(52) U.S. Cl.
CPC ...... *H04L 41/5009* (2013.01); *H04L 41/5012* (2013.01); *H04L 61/1511* (2013.01); *H04L 67/1097* (2013.01); *H04L 43/0864* (2013.01)

(58) Field of Classification Search
CPC . H04L 61/20; H04L 41/5012; H04L 43/0864; H04L 61/1511; H04L 67/2809; H04L 67/2814; H04L 67/2838; H04L 67/288; H04L 67/2895; H04L 67/322; H04L 67/327; H04L 29/12066; H04L 43/062; H04L 63/08; H04L 63/20; H04L 41/00; H04L 41/0893; H04L 41/147; H04L 41/50; H04L 41/5041; H04L 43/08; H04L 43/50; H04L 61/1552; H04L 61/2007;
(Continued)

(56) References Cited

U.S. PATENT DOCUMENTS 6,684,247 B1 * 1/2004 Santos ................. H04L 41/147
703/2
7,076,541 B1 * 7/2006 Burstein ........... H04L 29/12066
707/999.003
(Continued)

OTHER PUBLICATIONS

Nevil Brownlee et al., "DNS Root/gTLD Performance Measurement", Proceedings of the LISA 2001 15th System Administration Conference, Dec. 2001, pp. 241-256.
(Continued)

*Primary Examiner* — Greg C Bengzon
(74) *Attorney, Agent, or Firm* — MH2 Technology Law Group, LLP (57) ABSTRACT

Command performance may be monitored. In a monitoring transaction, a product may be selected from a plurality of products in one group of a plurality of groups of products. Execution performance of a command by the selected product may be monitored. The monitored execution performance may be provided for determining compliance with a service level agreement for the product based on the monitored executed performance.

19 Claims, 7 Drawing Sheets

(51) Int. Cl.
*H04L 29/08* (2006.01)
*H04L 12/26* (2006.01)

(58) Field of Classification Search
CPC . H04L 61/6013; H04L 63/0853; H04L 63/10; H04L 63/101; H04L 63/123; H04L 63/1433; H04L 67/28; H04L 12/2697; H04L 29/12632; H04L 61/302; H04L 67/2828; G06F 11/3664; G06F 11/3672; G06F 17/30312
See application file for complete search history.

(56) References Cited

U.S. PATENT DOCUMENTS

| | | | | |
|---|---|---|---|---|
| 7,251,826 B1* | 7/2007 | Gardos | H04L 63/08 | 709/225 |
| 8,214,524 B2* | 7/2012 | Kim | H04L 29/12066 | 709/238 |
| 8,291,117 B1* | 10/2012 | Eggleston | H04L 61/1511 | 709/245 |
| 8,688,681 B1* | 4/2014 | Xiao | G06F 7/00 | 707/709 |
| 8,990,392 B1* | 3/2015 | Stamos | H04L 43/08 | 709/224 |
| 9,049,229 B2* | 6/2015 | Thomas | H04L 29/12066 | |
| 9,106,661 B1* | 8/2015 | Stamos | H04L 63/10 | |
| 2001/0034847 A1* | 10/2001 | Gaul, Jr. | H04L 63/1433 | 726/25 |
| 2003/0065986 A1* | 4/2003 | Fraenkel | G06F 11/3006 | 714/47.2 |
| 2004/0010584 A1* | 1/2004 | Peterson | H04L 41/046 | 709/224 |
| 2005/0160335 A1* | 7/2005 | Peterson | H04L 41/046 | 714/724 |
| 2006/0101026 A1* | 5/2006 | Fukushima | H04L 29/06 | |
| 2008/0147885 A1* | 6/2008 | Bessis | H04L 29/12066 | 709/250 |
| 2008/0201413 A1* | 8/2008 | Sullivan | H04L 29/12066 | 709/203 |
| 2009/0157889 A1* | 6/2009 | Treuhaft | H04L 29/12066 | 709/230 |
| 2009/0313364 A1* | 12/2009 | Parsons | H04L 12/66 | 709/223 |
| 2010/0106764 A1* | 4/2010 | Chadwick | H04L 67/1002 | 709/202 |
| 2010/0107085 A1* | 4/2010 | Chadwick | H04L 63/20 | 715/738 |
| 2010/0205302 A1* | 8/2010 | Rechterman | H04W 4/02 | 709/226 |
| 2010/0257266 A1* | 10/2010 | Holmes | G06Q 30/00 | 709/224 |
| 2011/0125894 A1* | 5/2011 | Anderson | H04L 9/3213 | 709/224 |
| 2012/0117095 A1* | 5/2012 | Chavvakula | H04L 29/12632 | 707/758 |
| 2012/0158806 A1* | 6/2012 | Snyder | H04L 67/1097 | 707/827 |
| 2012/0173760 A1* | 7/2012 | Jog | H04L 61/1511 | 709/245 |
| 2012/0284505 A1* | 11/2012 | Smith | H04L 61/1511 | 713/151 |
| 2013/0173497 A1 | 7/2013 | Gould et al. | | |
| 2013/0174125 A1* | 7/2013 | Trim | G06F 11/3664 | 717/124 |
| 2013/0290269 A1* | 10/2013 | Griffiths | G06F 17/30289 | 707/684 |
| 2014/0181321 A1* | 6/2014 | Brzozowski | H04L 29/06047 | 709/245 |
| 2014/0280305 A1* | 9/2014 | James | H04L 61/1511 | 707/769 |
| 2014/0280849 A1* | 9/2014 | Aras | H04L 61/302 | 709/223 |
| 2015/0095374 A1* | 4/2015 | Pattapu | H04L 61/1511 | 707/780 |
| 2015/0288647 A1* | 10/2015 | Chhabra | H04L 61/1511 | 709/245 |
| 2015/0341229 A1* | 11/2015 | Richter | H04L 41/5035 | 709/224 |
| 2015/0365305 A1* | 12/2015 | Namata | G06Q 30/00 | 705/14.54 |
| 2016/0055490 A1* | 2/2016 | Keren | G06Q 30/00 | 705/14.47 |
| 2017/0034012 A1* | 2/2017 | Douglas | H04L 41/50 | |
| 2017/0048159 A1* | 2/2017 | Maenpaa | H04L 61/1511 | |
| 2017/0206252 A1* | 7/2017 | Pattapu | G06F 17/30542 | |
| 2017/0206256 A1* | 7/2017 | Tsirogiannis | G06F 17/30563 | |

OTHER PUBLICATIONS

Duane Wessels et al., "Measurements and Laboratory Simulations of the Upper DNS Hierarchy", International Workshop on Passive and Active Network Measurement, Springer Berlin Heidelberg, 2004, pp. 147-157.

Jinjin Liang et al., "Measuring Query Latency of Top Level DNS Servers", International Conference on Passive and Active Network Measurement, Springer Berlin Heidelberg, 2013, pp. 145-154.

* cited by examiner

| Run Number | On TLD | Using IP | Command Category |
|---|---|---|---|
| n | foo | IP4_1 | Session |
| n+1 | bar | IP4_2 | Transform |
| n+2 | foo | IP6_3 | Query |
| n+3 | bar | IP4_2 | Session |
| n+4 | foo | IP4_1 | Transform |
| n+5 | bar | IP6_3 | Query |
| n+6 | foo | IP6_3 | Session |
| n+7 | bar | IP4_1 | Transform |
| n+8 | foo | IP4_2 | Query |
| n+9 | bar | IP4_1 | Session |
| n+10 | foo | IP4_2 | Transform |
| n+11 | bar | IP6_3 | Query |
| n+12 | foo | IP4_2 | Session |
| n+13 | bar | IP6_3 | Transform |
| n+14 | foo | IP4_1 | Query |

COMMAND PERFORMANCE MONITORING

RELATED APPLICATIONS

This application claims priority to U.S. patent application Ser. No. 14/320,599 entitled "COMMAND PERFORMANCE MONITORING" filed on Jun. 30, 2014, which claims priority to India Patent Application No. 3759/CHE/2013 entitled "COMMAND PERFORMANCE MONITORING" filed on Aug. 26, 2013, the entire contents of both applications which are incorporated herein by reference in their entirety.

BACKGROUND

A domain name system (DNS) allows people using the Internet to refer to domain names, rather than IP addresses, when accessing websites and other online services. Domain names, which employ text characters, such as letters, numbers, and hyphens, may often be easier to remember than IP addresses, which are numerical and do not contain letters or hyphens. In order to implement a DNS, a variety of top-level domains (TLDs) have been created. A generic top-level domain (gTLD) is one type of top-level domain used in DNS. Examples of gTLDs that have already been created are ".com," ".net," and ".org." Another type of TLD is a country-code top-level domain (ccTLD) such as, for example, ".uk."

One or more second-level domains (SLDs) can be created under a TLD. For example, a SLD of "verisign" could be created under the TLD ".com" such that a website could be accessed at "verisign.com."

A domain name "Registry" is an entity that creates, that is, "registers" TLDs, and stores data regarding TLDs and SLDs to be created under the respective TLDs. A Registry may make stored data regarding TLDs available to one or more "Registrars." A Registrar may receive data from customers desiring to create one or more SLDs under a given TLD and may communicate this data to the Registry for storage.

Registries, as hosts of TLDs, are required to provide a system that meets a certain level of performance, for example, response time, availability, etc., as set forth by Internet Committee for Assigned Names and Numbers (ICANN). Performance levels may be set forth in service level agreements (SLA) for TLDs.

BRIEF DESCRIPTION OF THE DRAWINGS

The accompanying drawings, which are incorporated in and constitute a part of this specification, illustrate several examples and together with the description, serve to explain the principles of the disclosed examples. In the drawings.

DETAILED DESCRIPTION

Registries monitor performance of their system, for example, in order to ensure that they are providing a sufficient level of service as set forth in SLAB. Performance, as discussed herein, may refer to response time and/or availability of devices within the system. Monitoring may be performed for all hosted TLDs at all times. However, as the number of TLDs increases, monitoring requires a larger amount of processing time and resources to ensure compliance with SLAB.

As discussed herein, according to some examples discussed herein, command performance monitoring may be performed by grouping hosted TLDs into one of a plurality of groups. The grouping may occur based on one or more attributes associated with TLDs. Command categories may be identified for each of the plurality of groups. Command values may be determined for each of the command categories. A representative TLD may be selected from one or more groups. A command category and command value may be selected. In a monitoring transaction, the selected command may be executed with respect to the selected TLD. Performance of the executed command may be monitored, where performance with respect to the selected TLD may be representative of the performance of all of the TLDs in the group. In other words, the performance of any TLD in the group is expected to have a similar or same level of performance as all of the TLDs in the group.

According some examples discussed herein, where it is determined that the monitored performance, for example, intermittent response time, unavailability, etc., applies to only one of the TLD's in the group, that TLD's performance may be isolated and not considered representative of the performance of the group.

The monitored performance may be used to determine compliance with the SLA of the selected TLD. If the performance is not compliant with the TLD, an action may be initiated, for example, an alert may be generated, etc.

In this manner, commands need not be executed with respect to all TLDs at the same time. This may reduce processing time and resources, while still monitoring system performance.

In subsequent monitoring transactions, different TLDs within the group, different command categories, and different command values may be selected according to a selection algorithm, for example, round robin, random, etc. Performance of the subsequent monitoring transactions may be used to determine compliance with the SLA of the subsequently selected TLD. The performance of the selected TLD for each monitoring transaction may be representative of the performance of all TLDs in the group.

In some examples, a network interface may be selected from a plurality of network interfaces during each monitoring transaction according to a predetermined algorithm, for example, round robin, random, etc.

Figure 1A:
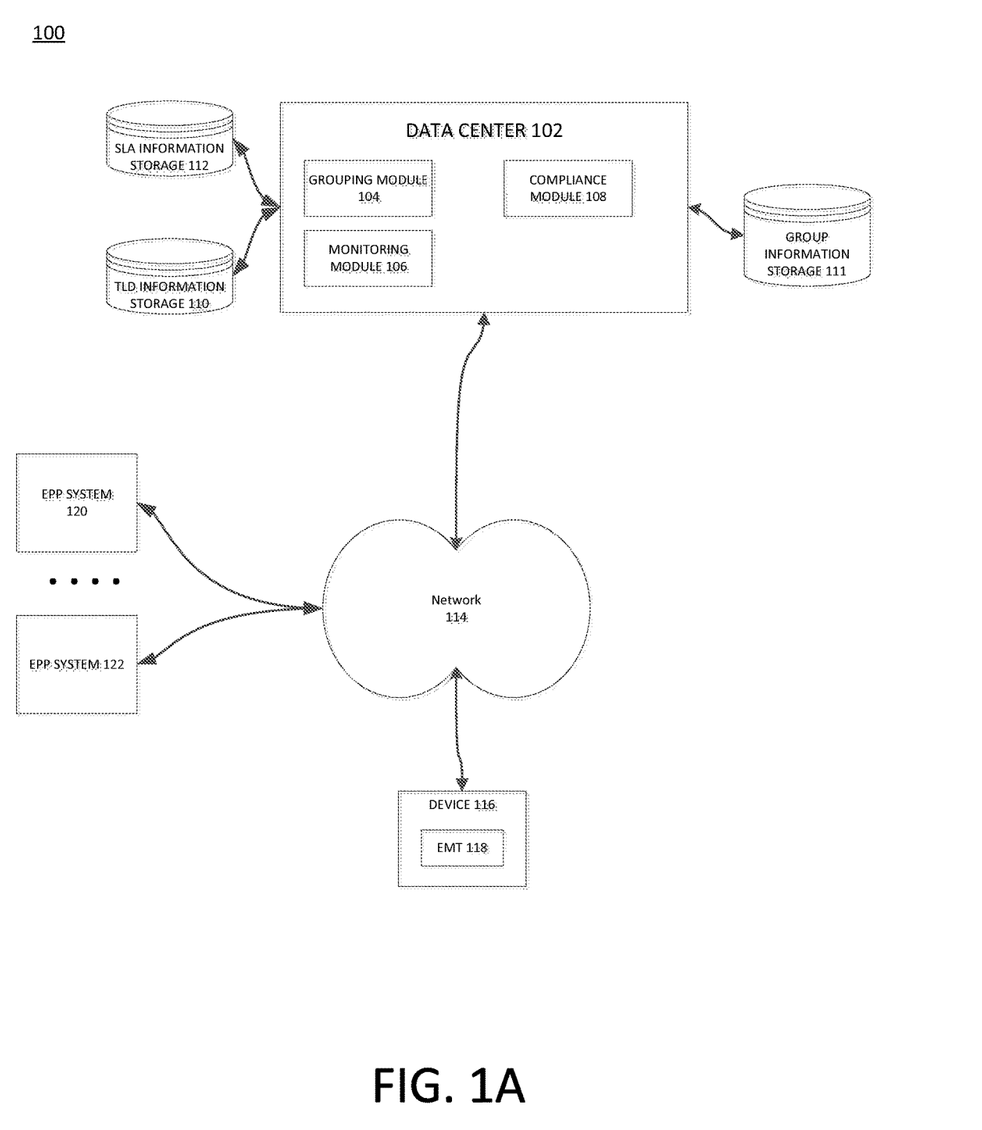
FIG. 1A is a diagram illustrating an example performance monitoring system, in accordance with one or more examples disclosed herein.
Figure 1B:
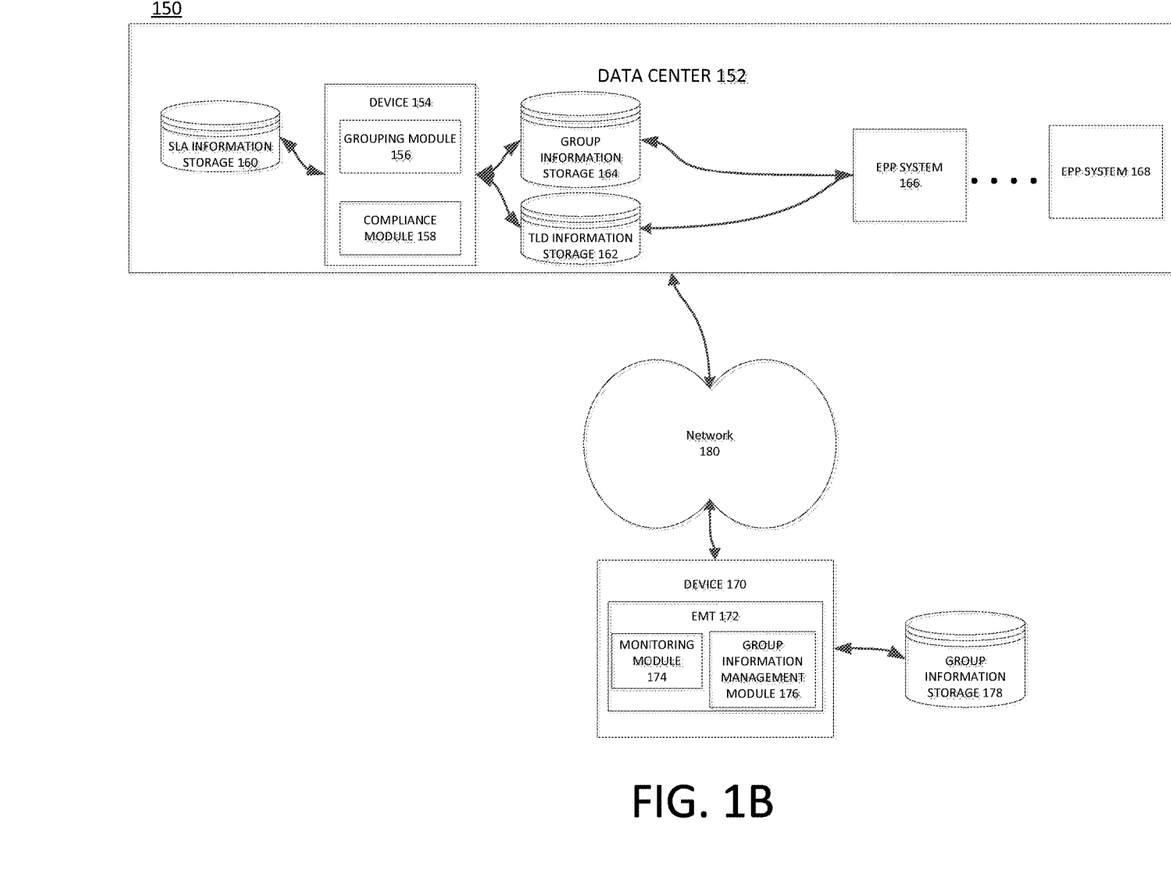
FIG. 1B is a diagram illustrating another example performance monitoring system, in accordance with one or more examples disclosed herein.

A system 100 according to one or more examples is shown in FIG. 1A. It may be appreciated that additional devices may reside within system environment 100 in accordance with the principles discussed herein. System 100 may include a data center 102 including a grouping module 104, a monitoring module 106 and compliance module 108. System 100 may further include extensible provisioning protocol (EPP) system 120, EPP system 122 and device 116 including external monitoring tool (EMT) 118, all communicably linked via network 114. It may be appreciated that according to some examples, EPP systems 120 and 122 may be located within data center 102 as shown in FIG. 1B. It may be further appreciated that while only one device 116 including EMT 118 is depicted, multiple devices including EMT 118 may reside and operate within system 100.

Data center 102 may be communicably linked to TLD information storage 110 and SLA information storage 112. Data center 102 may be communicatively connected via a network 114.

Grouping module 104 may generate a plurality of groups of TLDs, the plurality of groups having associated therewith one or more attributes of TLDs. According to some embodiments, grouping module 104 may access group information from one or more of EPP system 120, 122 and store the accessed group information in in group information storage 111. Each of the plurality of groups may be identified by a unique group identification number. Grouping module 104 may access data associated with TLDs from TLD information storage 110, including attributes associated with TLDs, and group them into one of the plurality of groups based on the accessed data, including the attributes. Thus, each of the groups include a set of products, or, in this example, TLDs. Attributes may be some property, characteristic, business rule, etc., of TLDs. Examples of attributes are:

DNS security (DNSSEC), and may indicate whether a TLD supports DNSSEC or not;

Thick, and may indicate whether a TLD supports contact information or not;

Internationalized domain name (IDN), and may indicate whether a TLD supports IDN labels or not;

Pending create, and may indicate whether a TLD allows domain creation on a first come first serve basis;

A phase of the TLD, for example, pre-delegation, pre-launch, sunrise, claims, open, etc., as more fully discussed below.

Backend hardware system, and may indicate the backend system the TLD is hosted on; etc.

Grouping module 104 may further associate command categories to each of the plurality of groups, to each of the TLDs in each of the groups, etc. Grouping module 104 may further associate command values to each of the associated command categories. It may be appreciated that the command values may be implemented as, for example, EPP commands. The EMT 118 or 172 discussed below may interact with EPP systems using EPP over TCP. In some examples, other types of commands may be utilized.

The groups, the TLDs associated with each of the groups, the command categories and command values for each of the groups may be stored, for example, in group information storage 111. In some examples, the grouping of command categories and/or commands may be performed by EMT 118.

In some examples, command categories may include commands that test a particular part of a system. The following are examples of command categories and their respective possible command values:

1. Command category: Session commands. Command values: Session Command, followed by Login Command (including TCP Session start), and Logout Command (including TCP session close). Commands in this category may test network connectivity, login credentials and grants for a user.

2. Command Category: Query. Command Values: Check Command and Info Command. Commands in this category may test database read operations.

3. Command Category: Transform. Command Values: Create Command, DNSSEC Create, Delete Command, Renew Command, Update Command, and DNSSEC Update. Commands in this category may test the database write operations.

It may be appreciated that additional and/or alternative categories may be utilized.

According to some examples discussed herein, certain commands may be selected based on the phase of the TLD, in order to avoid creating false data, for example, false errors. For example, where the phase of the TLD is pre-delegation, the first phase of the creation of a TLD, the TLD is available, but ICANN performs testing in order to ensure the TLD is operational. Thus, only Query commands may be performed. The next phase may be a pre-launch phase where the TLD is being tested by other components in system 100 (not shown) to ensure the TLD is operational. In this phase, no commands may be selected, or Query commands may only be performed, so as to not interfere with the testing. The next phase may be the sunrise phase. During the sunrise phase, the owner of the TLD provides evidence of signed mark data, and thus, only Query commands may only be performed. The last phase is the claims phase. During the claims phase, the TLD is fully operation and thus, any of the commands noted above may be performed.

According to other examples discussed herein, the below set of EPP Commands may be run based on the TLD Phase:
 a. Pre Delegation, Claims, and Open Phase: All command groups can be run.
 b. Pre Launch Phase: No EPP command must be run.
 c. Sunrise Phase: Only Session group commands, and Domain Check EPP command can be run.

It may be appreciated that once the grouping module creates, or accesses, the groups and assigns TLDs to the groups, TLDs and their associated group IDs may be stored in group information storage and/or communicated to device 116.

Monitoring module 106 may access information in group information storage 111 and generate monitoring transactions utilizing the accessed information in group information storage 111.

To monitor a group of TLDs, monitoring module 106 generates monitoring transactions by choosing the following items based on a predetermined algorithm, for example, round robin, random, etc.:
 1. A TLD from the list of TLDs in the group;
 2. A network interface from the list of network interfaces;
 3. A command category from the list of command categories for the TLD determined in 1.; and
 4. A command value from the category chosen in 3.

Each monitoring transaction executed by monitoring module 106 is different from the previous one in a manner that it monitors a different TLD, a different command from a different command category, and, in some examples, a different network interface. For example, for monitoring 10 groups every minute, monitoring module 106 sends 10 transactions every minute.

The algorithms for selecting the components of the monitoring transactions, including the TLD, command category, command and network interface, may be set by default, set by an administrator through a user interface (not shown), etc.

In some examples, the monitoring transactions may be executed at multiple edge sites (one edge site is shown in system environment 100, for example, device 116, however it may be appreciated that system environment 100 may include multiple edge sites).

Monitoring module 106, according to some examples, may determine or receive a plurality of performance variables including the response time, namely the time from when a request is sent to perform the command value to the time when the response is received. Another performance variable may include availability, namely if the TLD is available or not. The response time and/or availability information may be passed to compliance module 108 together with additional information regarding the monitoring transaction, for example, the group ID, the TLD, etc.

In some examples, monitoring module 106 or compliance module 108 may also determine if the compliance with the SLA is not met at a "majority" number of the totally number of edge sites, as it may verify by getting performance regarding monitoring transactions from multiple edge sites (via EMTs). For example, where monitoring module 106, or compliance module 108, determines that one of the TLD's is not available, it may then declare that the TLD service is down for majority of the users/sites; and can start counting the service down time. It can thus measure the SLA for availability of service as well (other than, or in addition to, the performance SLA).

Device 102 may further include compliance module 108. Compliance module 108 may receive the performance time of the monitoring transaction. Compliance module 108 may access SLA information storage 112 to access SLA information, including the maximum performance time, related to the TLD. If the performance time is above a threshold set forth in the accessed SLA, an alert may be generated and transmitted to one or more devices within system environment 100 or other actions may be taken.

System environment 100 may further include device 116 that includes external monitoring tool (EMT) 118. Device 116 may be located at a geographically remote site, for example, a network edge site. Performance at a network edge site may be representative of a client device's experience. EMT 118 may facilitate monitoring transactions by monitoring the round trip responses of EPP commands for TLDs as discussed herein. EMT 118 may be communicably linked to group information storage 111, or may have a local storage storing group information (not shown).

EMT 118 may, according to some examples, include a grouping module (not shown) that performs the functionality as discussed above with regard to grouping module 104.

EMT 118 may select commands and transmit a request, similar to a request from a client device, as discussed above with regard to monitoring module 106. EMT 118 may monitor performance including the time taken from sending the request to receiving a response to the request. EMT 118 may record the time and may further transmit the time, together with data associated with the request, to device 102. The information collected by EMT 118 may be transmitted to monitoring module 106 and/or compliance module 108 to determine compliance with one or more SLA's.

Device 116 may store locally, in a group information storage (not shown), information related to each of the groups, the TLDs in each of the groups, the command categories and the command values for each of the command categories. This group information may be accessed and utilized to generate monitoring transactions as discussed herein.

Device 116 may transmit queries to the data center 102 in order to determine if there are any changes for any TLDs. According to some examples, device 116 may query one or more EPP systems directly. The changes may include, for example, changes in attributes and thus changes in group assignments. Device 116 may receive updates from data center 102, or one or more EPP systems, including updates to attributes associated with TLDs, group assignments in the form of group IDs, etc. Device 116 may update group information stored in group information storage based on the information received from data center 102.

System environment may further include device 120 and device 122 including an EPP system. Device 120 and device 122 may host multiple TLDs and interact with client devices (not shown) using EPP over TCP, or other protocols. Device 120 and device 122 may receive requests related to monitoring transactions and may further respond to the received requests. The performance and availability of device 120 and device 122 may be monitored to ensure compliance with SLAB. In some examples, devices 120 and 122 may be located within datacenter 102.

Network 114 may include one or more direct communication links, local area networks (LANs), wide area networks (WANs), or any other suitable connections. Network 115 may also include the Internet.

Grouping module 104, monitoring module 106 and compliance module 108 may be one or more applications implemented on a device including one or more processors (not shown) coupled to memory (not shown). The processors may include, e.g., a general purpose microprocessor such as a processor manufactured by Intel Corporation of Santa Clara, Calif.; an application specific integrated circuit that embodies at least part of the method in accordance with certain examples in its hardware and firmware; a mobile device processor, a combination thereof; etc. The memory may be any device capable of storing electronic information, such as RAM, flash memory, a hard disk, an internal or external database, etc. The memory can store instructions adapted to be executed by the processor to perform at least part of the method in accordance with certain embodiments. For example, the memory can store computer software instructions, for example, computer-readable or machine-readable instructions, adapted to be executed on the processor to monitor performance in addition to other functionality discussed herein.

In the example shown in FIG. 1A, grouping module 104, monitoring module 106 and compliance module 108 are provided by data center 102. In other examples, the one or more of the grouping module 104, monitoring module 106, and compliance module 108 may be provided by other devices or services, shown or not shown, in system environment 100. In some examples, these modules or other logic may be implemented in, or supported in, a cloud-based environment.

While FIG. 1A shows SLA information storage 112, TLD information storage 110 and group information storage 111 at data center 102, these databases may be stored separately and accessed remotely by monitoring module 106. For example, data center 102 may access one or more of the databases via network 114, as shown in FIG. 1A. Further, according to some examples, one or more of TLD information storage 110, group information storage 111 and SLA information storage 112 may be located within the same storage device.

A system 150 according to one or more examples is shown in FIG. 1B. It may be appreciated that additional devices may reside within system environment 150 in accordance with the principles discussed herein. System 150 may include a data center 152 including device 154. Device 154 may include a grouping module 156 and compliance module 158. Data center 152 may further include EPP system 166, EPP system 168. Device 154 may include, or be communicably linked to SLA information storage 160. Further, device 154 and EPP systems 166 and 168 may include, or be communicably linked to, TLD information storage 162 and group information storage 164. System environment 150 may further include device 170 including EMT 172. EMT 172 may include monitoring module 174 and group information management module 176. Device 170 may include, or be communicably linked to group information storage 178. Devices within system environment 150 may be communicably linked via network 180. According to some examples, device 170 may include a grouping module as discussed above with regard to grouping module 104 or discussed below with regard to grouping module 156.

Further, according to some examples, grouping module 156 may reside within EPP system 166 and/or EPP system 168 and perform the grouping functionality as discussed herein.

Further, according to some examples, the compliance module 158 may reside at EMT 172 where EMT 172 may have access to, or store, SLA information storage 160.

It may be appreciated that according to some examples, EPP systems 166 and 168 may be located outside data center 102.

Grouping module 156 may generate a plurality of groups, the plurality of groups having associated therewith one or more attributes of TLDs. According to some embodiments, grouping module 156 may access group information from one or more of EPP system 166, 168 at datacenter 152 and store the accessed group information in in group information storage 111. Each of the plurality of groups may be identified by a unique group identification number. Grouping module 156 may access data associated with TLDs from TLD information storage 162, including attributes associated with TLDs, and group them into one of the plurality of groups based on the accessed data, including the attributes. Thus, each of the groups include a set of products, or, in this example, TLDs. Attributes may be some property, characteristic, business rule, etc., of TLDs.

The grouping described with respect to grouping module 104 may be the same process performed by grouping module 104.

Grouping module 156 may further associate command categories to each of the plurality of groups, to each of the TLDs in each of the groups, etc. Grouping module 156 may further associate command values to each of the associated command categories, as discussed above. The groups, the TLDs associated with each of the groups, the command categories and command values for each of the groups may be stored, for example, in group information storage 164.

It may be appreciated that once the grouping module creates, or accesses, the groups and assigns TLDs to the groups, TLDs and their associated group IDs may be communicated to device 170. According to some examples, the device hosting grouping module 156, for example, device 154, EPP system 166, EPP system 168, etc., may publish the TLD group information, including creation of the groups and the set of products in the groups, changes to one or more products within a group, etc.

Device 154 may further include compliance module 158. Compliance module 158 may receive the performance time of the monitoring transaction. Compliance module 158 may access SLA information storage 160 to access SLA information, including the maximum performance time, related to the TLD. If the performance time is above a threshold set forth in the accessed SLA, or when availability of a TLD is below a majority of edge sites, an alert may be generated and transmitted to one or more devices within system environment 150.

System environment 150 may further include device 170 that includes external monitoring tool (EMT) 170. Device 170 may be located at a geographically remote site, for example, a network edge site. EMT 172 may facilitate monitoring transactions by monitoring the round trip responses of EPP commands for TLDs as discussed herein. EMT 172 may be communicably linked to group information storage 178, or may have a local storage storing group information (not shown).

EMT 170 may include monitoring module 174. Monitoring module 174 may access information in group information storage 178 and generate monitoring transactions utilizing the accessed information in group information storage 178. Specifically, monitoring module 174 may select TLDs from a plurality of groups, select command categories and commands associated with the categories, and transmit a request, similar to a request from a client device. In some examples, a network interface may be selected and utilized to transmit the request.

Monitoring module 174 may monitor the time taken from sending the request to receiving a response to the request. Monitoring module 174 may record the time and may further transmit the time, together with data associated with the request, to one or more devices within data center 152.

To monitor a group of TLDs, monitoring module 174 generates monitoring transactions by choosing the following items based on a predetermined algorithm, for example, round robin, random, etc.:

1. A TLD from the list of TLDs in the group;
2. A network interface from the list of network interfaces;
3. A command category from the list of command categories for the TLD determined in 1.; and
4. A command value from the category chosen in #3.

Each monitoring transaction executed by monitoring module 174 is different from the previous one in a manner that it monitors a different TLD, a different command from a different command category, and in some examples, a different network interface. For example, for monitoring 10 groups every minute, monitoring module 106 sends 10 transactions every minute.

The algorithms for selecting the components of the monitoring transactions, including the TLD, command category, command and network interface, may be set by default, set by an administrator through a user interface (not shown), etc.

In some examples, the monitoring transactions may be executed at multiple edge sites (one edge site is shown in system environment 150, for example, device 170, however it may be appreciated that system environment 150 may include multiple edge sites).

Monitoring module 174 may determine or receive the performance time, namely the time from when a request is sent to perform the command value to the time when the response is received. The performance time may be transmitted to compliance module 158 together with additional information regarding the monitoring transaction, for example, the group ID, the TLD, etc.

In some examples, monitoring module 174 or compliance module 158 may also determine if the compliance with the SLA is not met at "majority" of the edge sites, as it may verify by getting performance regarding monitoring transactions from multiple edge sites (via EMTs). For example, where monitoring module 174, or compliance module 158, determines that one of the TLD's is not available, it then may declare that the TLD service is down for majority of the users/sites; and can start counting the service down time. It can thus measure the SLA for availability of service as well (other than, or in addition to, the performance SLA).

Device 170 may store locally, in a group information storage (not shown), information related to each of the groups, the TLDs in each of the groups, the command categories and the command values for each of the command categories. This group information may be accessed and utilized to generate monitoring transactions as discussed herein.

EMT 172 may include group information management module 176. Group information management module may manage group information stored in group information storage 178. For example, group information management module 176 may transmit queries periodically to the data center 152, for example, device 154, EPP system 166, EPP 168, etc., in order to determine if there are any changes for any TLDs. The changes may include, for example, changes in attributes, changes in group assignments, etc. Group management module 176 may receive updates from one or more devices within data center 152 including updates to attributes associated with TLDs, group assignments in the form of group IDs, etc. Group information management module 176 may update group information stored in group information storage 178 based on the received information.

System environment may further include device 166 and device 168 including an extensible provisioning protocol (EPP) system. Device 166 and device 168 may host multiple TLDs and interact with client devices (not shown) using EPP over TCP. Device 166 and device 168 may receive requests related to monitoring transactions and may further respond to the received requests. The performance of device 166 and device 168 may be monitored to ensure compliance with SLAB.

According to some examples, device 166 and/or device 168 may include grouping module 156 and may generate one or more plurality of groups including a set of TLDs as discussed herein.

Network 180 may include one or more direct communication links, local area networks (LANs), wide area networks (WANs), or any other suitable connections. Network 180 may also include the Internet.

Grouping module 156, monitoring module 174, group information management module 176 and compliance module 108 may be one or more applications implemented on a device including one or more processors (not shown) coupled to memory (not shown). The processors may include, e.g., a general purpose microprocessor such as a processor manufactured by Intel Corporation of Santa Clara, Calif.; an application specific integrated circuit that embodies at least part of the method in accordance with certain examples in its hardware and firmware; a mobile device processor, a combination thereof; etc. The memory may be any device capable of storing electronic information, such as RAM, flash memory, a hard disk, an internal or external database, etc. The memory can store instructions adapted to be executed by the processor to perform at least part of the method in accordance with certain embodiments. For example, the memory can store computer software instructions, for example, computer-readable or machine-readable instructions, adapted to be executed on the processor to monitor performance in addition to other functionality discussed herein.

While FIG. 1B shows SLA information storage 160, TLD information storage 162 and group information storage 164 at data center 152, these databases may be stored separately and accessed remotely by one or more devices within data center 152. For example, data center 152 may access one or more of the databases via network 180, as shown in FIG. 1B. Further, according to some examples, one or more of TLD information storage 162, group information storage 164 and SLA information storage 160 may be located within the same storage device.

In accordance with some examples, performance monitoring herein may be implemented such that load balanced systems may be individually monitored. In these examples, selected commands may be directed to specific instances out of the load balanced set of redundant systems where health of the systems may be monitored.

Devices 102, 120, 122, 116, 154, 166, 168 and 170 include the necessary hardware and/or software needed to communicate with their respective networks 114 and 180 via a wired and/or a wireless connection. Devices 102, 120, 122, 116, 154, 166, 168 and 170 may be embodied by server computing devices, desktop/laptop/handheld computers, wireless communication devices, etc., or any other similar devices having the necessary processing and communication capabilities. In an embodiment, the network 114 and 180 may comprise a public communication network such as the Internet or World Wide Web and/or a private communication network such as a local area network (LAN), wide area network (WAN), etc.

As discussed herein, devices 102, 120, 122, 116, 154, 166, 168 and 170 include one or more processors in communication with one or more storage devices. The processor(s) may comprise a microprocessor, microcontroller, digital signal processor, co-processor or other similar devices known to those having ordinary skill in the art. The applications and modules described herein may be implemented as either software, firmware and/or hardware applications and may be implemented as a set of computer or machine-readable instructions stored in any type of non-transitory computer-readable or machine-readable storage medium or other storage device. Some non-limiting examples of non-transitory computer-readable mediums may be embodied using any currently known media such as magnetic or optical storage media including removable media such as floppy disks, compact discs, DVDs, flash memory, hard disk drives, etc. In addition, the storage device(s) as discussed herein may comprise a combination of non-transitory, volatile or nonvolatile memory such as random access memory (RAM) or read only memory (ROM). One or more storage devices has stored thereon instructions that may be executed by the one or more processors, such that the processor(s) implement the functionality described herein. In addition, or alternatively, some or all of the software-implemented functionality of the processor(s) may be implemented using firmware and/or hardware devices such as application specific integrated circuits (ASICs), programmable logic arrays, state machines, etc.

Figure 2:
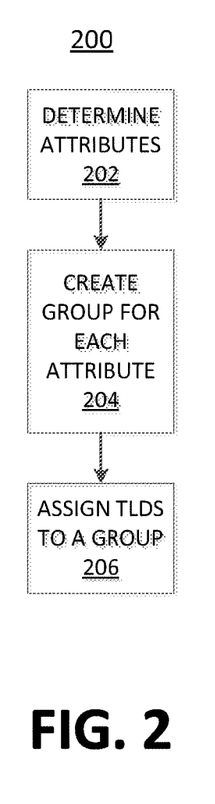
FIG. 2 is a flow diagram of a process for generating groups, in accordance with one or more examples disclosed herein.

FIG. 2 is an example flow diagram of a process 200 for generating one or more groups, in accordance with some examples herein.

According to some examples as discussed herein, one or more EPP systems, 120, 122, 166, 168, may perform one or more of the steps included in process 200. A set of attributes may be determined (202). The attributes may be related to one or more TLDs. Attribute information may be accessed from TLD information storage 110 or 162. A group may be created for each attribute that was determined (204). For each group that is created, a group identification number (ID) may be generated and associated with the group.

Information related to a plurality of TLDs may be accessed. The accessed information may include attributes associated with each of the TLDs. TLDs may be assigned to one of the created groups based on the associated attributes (206).

It may be appreciated that grouping module 104 or 156 may periodically verify that the attributes of the TLDs have not changed. If there is a change in a TLD attribute to a new attribute, the TLD may be reassigned to a different group based on the new attribute.

Each of the created groups, together with the assigned TLDs, may be stored in group information storage 111 or 178.

Each of the created groups, together with the assigned TLDs, may be transmitted to device 116.

According to some examples, grouping module 104 or 156 may access information regarding multiple TLDs from one or more of EPP systems 120, 122, 166, 168. The accessed information may be analyzed in order to ascertain the groups in which each of the TLDs are assigned. The groups may then be created and stored for use in the monitoring process discussed herein.

Figure 3:
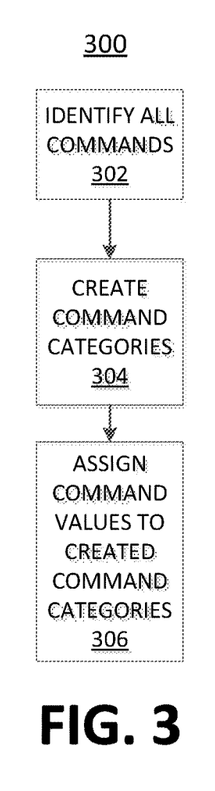
FIG. 3 is a flow diagram of a process for generating command categories, in accordance with one or more examples disclosed herein.

FIG. 3 is an example flow diagram of a process 300 for generating command categories. Grouping module 104 or 156, or monitoring module 106 or 174, or other modules discussed herein, may perform one or more of the steps included in process 300. One or more of the steps included in processing 300 may likewise be performed by other components of system 100.

It may be appreciated that the generation of command categories may, alternatively be performed at other devices within system environment 100 or 150, for example, at device 116, device 170 by EMT 118 or EMT 172, at EPP system 120 or 122, or EPP system 166 or 168, etc.

All possible commands that may be executed within the EPP system may be identified (302). The possible commands may be determined, for example, based on the phase that a TLD is in. TLD phase is discussed more fully below. Based on the identified commands, command categories may be created (304). Each of the identified commands may be assigned as command values to one of the created command categories (306). The command categories and assigned command values may be stored in group information storage 111 or 178.

For example, command categories may include a "query" category, where command values in this category do not change state of persistent store; "transform", where command values in this category change state of persistent store; and "session", where command values in this category are commands for login/logout into a system. It may be appreciated that in other examples, different categories of commands may be utilized.

In accordance with some examples, attributes of TLDs may change from time to time. Where an attribute has changed to a new attribute, for example, based on an update to the TLD information in TLD information storage 110 or 162, this may trigger a reassignment of the TLD from one group to a new group, where the new group has the new attribute associated therewith. Thus, the group ID associated with the TLD may be updated. Updated TLD assignment may be stored in group information storage 111 or 178 and further, may be communicated to device 116 for EMT 118 or to device 170 for EMT 172.

Figure 4:
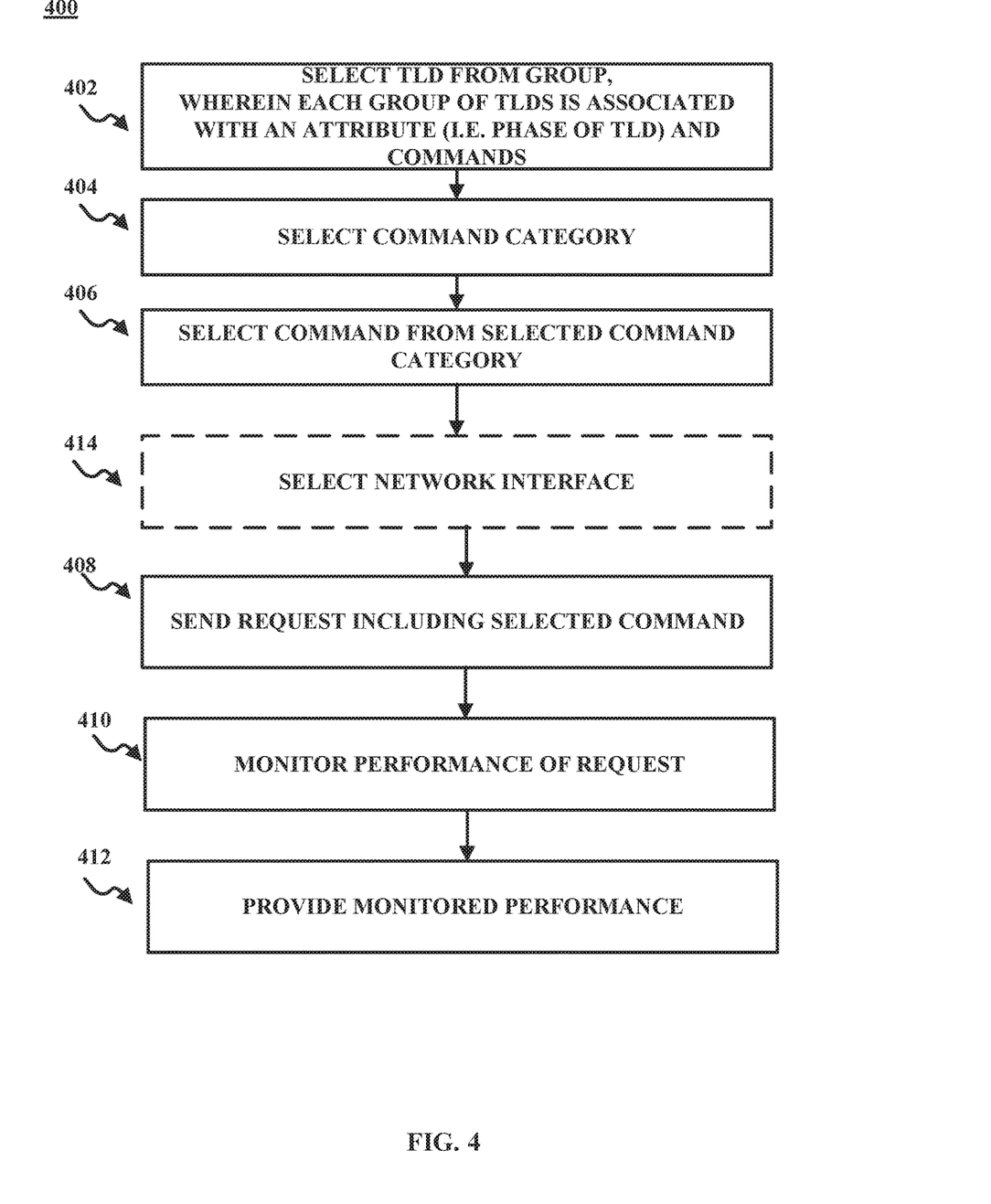
FIG. 4 is a flow diagram of a process for monitoring performance, in accordance with one or more examples disclosed herein.

FIG. 4 is a flow diagram of a process 400 for performing a monitoring transaction. Process 400 may be performed, for example, by monitoring module 106 or 174, EMT 118 or 172, etc. It may be appreciated that process 400 may be performed for each of the groups that were created in FIG. 2.

As shown in FIG. 4, a TLD is selected from a group (402). The TLD may be selected based on a predetermined algorithm, for example, round robin, random, etc. Where the algorithm is a round robin algorithm, TLDs may be selected sequentially in order such that every TLD is selected once before a TLD is selected twice. Thus, TLDs may be stored in group information storage 111 or 178 in such a manner to facilitate execution of the round robin algorithm. Further, a mechanism, for example, a pointer, etc., may be utilized to identify the state of the round robin. For example, a pointer may be utilized to identify which TLD to use, and when a TLD is selected, the pointer may be updated to point to the next TLD in the sequential order.

A command category in selected (404). The command categories may be selected based on the command categories associated with the group, the TLD, etc. The command category may be selected based on a predetermined algorithm, for example, round robin, random, etc. Where the algorithm is a round robin algorithm, command categories may be selected sequentially in order such that every command category is selected once before a command category is selected twice. Thus, command categories may be stored in group information storage 111 or 178 in such a manner to facilitate execution of the round robin algorithm. Further, a mechanism, for example, a pointer, etc., may be utilized to identify the state of the round robin. For example, a pointer may be utilized to identify which command category to use, and when a command category is selected, the pointer may be updated to point to the next command category in the sequential order.

In some examples, the algorithm may be applied to command categories within the group, or within the selected TLD.

A command value may be selected from the selected command category (406). The command value may be selected based on the command values associated with the command categories for the group. The command value may be selected based on a predetermined algorithm, for example, round robin, random, etc. Where the algorithm is a round robin algorithm, command values may be selected sequentially in order such that every command value is selected once before a command value is selected twice. Thus, command values may be stored in group information storage 111 or 178 in such a manner to facilitate execution of the round robin algorithm. Further, a mechanism, for example, a pointer, etc., may be utilized to identify the state of the round robin. For example, a pointer may be utilized to identify which command value to use, and when a command value is selected, the pointer may be updated to point to the next command value in the sequential order. It may be appreciated that other mechanisms may be utilized to facilitate selection of products in a set of products according to the predetermined algorithm.

A request may be sent including the selected command (408). The request may be sent to the device hosting the selected TLD.

Performance of the request may be monitored (410). For example, the round trip time, for example, the time taken from sending the request to receiving a response to the request may be determined. The round trip time may be recorded.

The monitored performance may be provided (412). For example, the round trip time may be provided to a module or device, for example, to compliance module 108 or 158, to device 102, etc.

According to some examples, prior to sending the request in (408), a network interface, for example, an IP address, may be selected (414) from a plurality of network interfaces, for example, IP addresses. The network interface may be selected based on the group. The network interface may be selected based on a predetermined algorithm, for example, round robin, random, etc. Where the algorithm is a round robin algorithm, network interfaces may be selected sequentially in order such that every network interface is selected once before a network interface is selected twice. Thus, network interfaces may be stored in group information storage 111 or 178 in such a manner to facilitate execution of the round robin algorithm. Further, a mechanism, for example, a pointer, etc., may be utilized to identify the state of the round robin. For example, a pointer may be utilized to identify which network interface to use, and when a network interface is selected, the pointer may be updated to point to the next network interface in the sequential order.

The monitored performance may be passed to compliance module 108 or 158. Additional information may further be passed, including one or more of the group ID of the TLD that processed the command, identifying information of the TLD that processed the command, etc. Compliance module 108 or 158 may access SLA information storage 112 or 160 to access SLA information associated with the TLD. Compliance module 108 or 158 may compare the accessed SLA information with the received monitored performance to make a determination whether the monitored performance is in compliance with the SLA, for example, is being processed in accordance with processing time requirements. If the monitored performance is not in compliance with the SLA, an action may be initiated, for example, an alert may be issued and transmitted to a display, to a device, etc.

In accordance with some examples discussed herein, compliance module 108 and/or compliance module 158 may perform additional functionality. For example, if compliance module 108 and/or compliance module 158 identify a failure, against a specific TLD only, while other TLDs in the group are available, the failing TLD may be isolated such that the failing TLD would not be considered as representative of the group.

In this example, compliance module 108 and/or compliance module 158 receive performance data from devices 116 and 170, respectively. Further, the compliance modules may receive performance data from other monitoring devices not shown in FIGS. 1A and 1B. In analyzing the received performance data, the compliance modules may determine that the failure is attributed to only one of the TLD's in the group. Additional commands may be targeted to the failed TLD and/or to the other TLDs in the group to determine if the failing TLD is a persistent issue and/or if there are other failing TLD's in the group. These additional commands may be sent by devices 116, 170, or other devices within the system, at a rate that is faster than the rate in which the EMT 118 and 172 were monitoring the groups. Compliance module 108 and/or compliance module 158 may receive the performance results of the additional commands that were sent to the failing TLD and/or the other TLDs in the group.

If it is determined that the failing TLD is the only failing TLD in the group, then the failing TLD may be considered isolated, as it is not representative of the performance of the group, and no alert may be sent. The failing TLD may be isolated until further monitoring information is received indicating that the TLD is no longer failing. If it is determined that there is one or more other TLDs failing in the group, then the TLD may be considered representative of the group and an alert may be generated.

Figure 5:
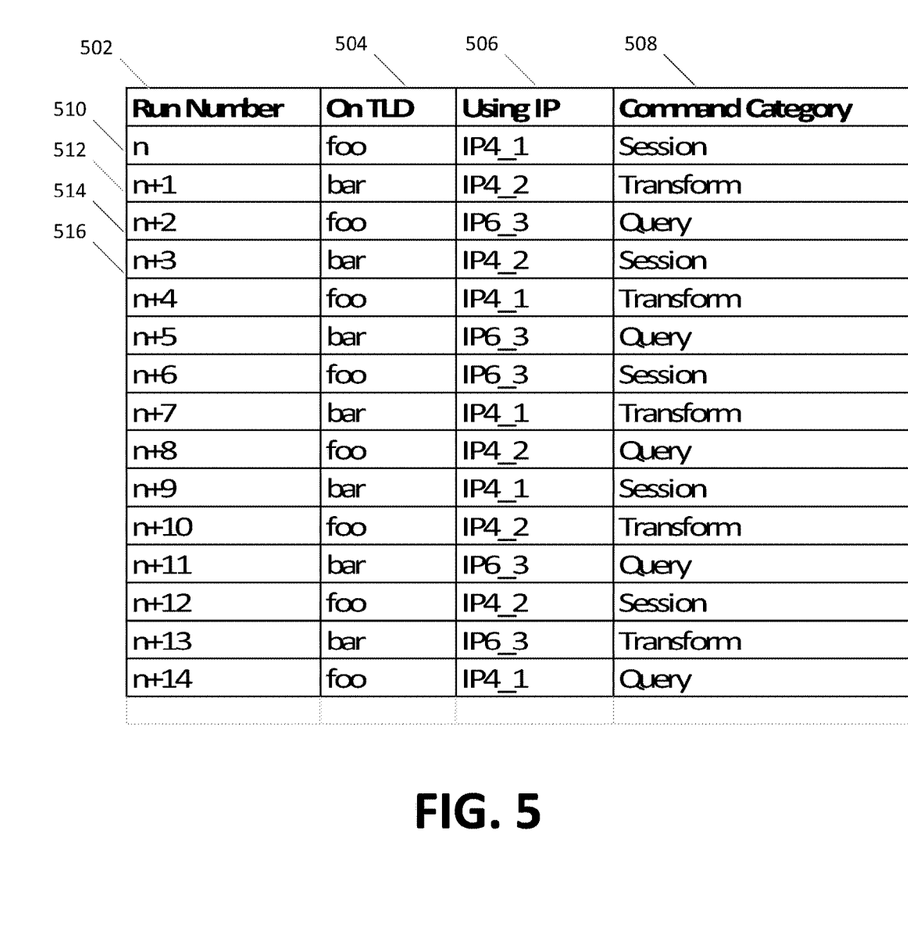
FIG. 5 is an example diagram depicting multiple monitoring transactions, in accordance with one or more examples disclosed herein.

FIG. 5 is an example of multiple, sequential monitoring transactions utilizing a round robin algorithm to monitor a TLD group by selecting the TLD, the network interface and the command category. As shown in FIG. 5, run number 502 indicates the monitoring transaction number. ON TLD 504 indicates the selected TLD for the monitoring transaction. Using IP 506 indicates the selected network interface for the monitoring transaction. Command Category 508 indicates the selected command group for the monitoring transaction.

In this example, The following command categories and their respective possible command values may be utilized:

1. Command category: Session commands. Command values: Session Command, followed by Login Command (including TCP Session start), and Logout Command (including TCP session close).
2. Command Category: Query. Command Values: Check Command and Info Command.
3. Command Category: Transform. Command Values: Create Command, DNSSEC Create, Delete Command, Renew Command, Update Command, and DNSSEC Update.

In an example discussed with regard to FIG. 5, an interval between generating monitoring transactions may be in the order of 1 minute.

The monitoring transactions may rotate over a randomly chosen IP address for each run, or transaction.

The monitoring transactions may rotate between the command categories, and between each command value in a command category. Thus, Run#1 510: The Create EPP Session, Login, Logout would be run on TLD foo using IPv4_1. It may be appreciated that Create EPP Session, Login, Logout belong to Command category (508) "Session".

Run#2 512: The Domain Create would be run, using pseudorandom domain name on TLD bar, using a randomly chosen IP address IPv4_2. It may be appreciated that Domain Create belongs to Command category (508) "Transform".

Run#3 514: The Domain Check would be run on TLD foo using a randomly chosen IP address IPv6_3. It may be appreciated that Domain Check belongs to Command category (508) "Query".

Run#4 516: The Create EPP Session, Login, Logout would be run on TLD bar using a randomly chosen IP address IPv4_2. It may be appreciated that Create EPP Session, Login, Logout belong to Command category (508) "Session".

Monitoring transactions may rotate in a round robin fashion over a product, or TLD, belonging to a group.

Pool of EPP Session instances may be used for running Query and Transform commands; whereas EPP commands belonging to EPP Session category shall be run using a new EPP Session instance each time. For example, for sending any EPP command to a TLD, EMT 118 or 172 may to login into the EPP system by sending a LOGIN command first. Once logged in, EMT 118 or 172 gets an EPP Session that can be used to send other EPP commands to the EPP system. Since the objective is to send a granular EPP command (like DOMAIN_CREATE) when the turn comes, EMT 118 or 172 uses a pre-created pool of EPP Sessions to send the other EPP commands (like DOMAIN_CREATE, DOMAIN_CHECK, etc.) However, to check the SLA for LOGIN command itself, EMT 118 or 172 may create a "new" LOGIN command, and not use the pre-created pool. Thus, when it is its turn for one of the commands from "Session" Command Group (LOGIN, and LOGOUT), then EMT 118 or 172 may not use session pool. TLD properties discovered via TLD Info Response shall be used to adjust the sequence and order of EPP commands to execute on products.

When a specific command run is executed, which depends on a pre-created EPP object, then EMT 118 or 172 would make an attempt to see if an EPP object is available as a result of previous commands run. If available EMT 118 or 172 can use that EPP object, else would create one, and execute the command.

TLD phase may dictate to EMT 118 or 172 what commands are supposed to be serviced by the TLD based on what phase the TLD is in. Usually a new TLD may be in a pre-delegation phase for a period of time, for example, about 1 month, then in the Sunrise phase for a period of time, for example, about 1 month, then in the claims phase for a period of time, for example, about 1 month, and finally to open phase, where the TLD remains thereafter. The particular phase a TLD is in may be stored in TLD information storage 110, 162 and/or may be stored in group information storage 111 or 178, 164. Similar to how EMT 118 or 172 queries for TLD group, TLD also queries for TLD phase and can determine what commands the TLD can serve. Based on this, EMT 118 or 172 may create the commands for that TLD.

As can be seen by this example, different algorithms or the same algorithms may be used to selected different components of the monitoring transaction.

Figure 6:
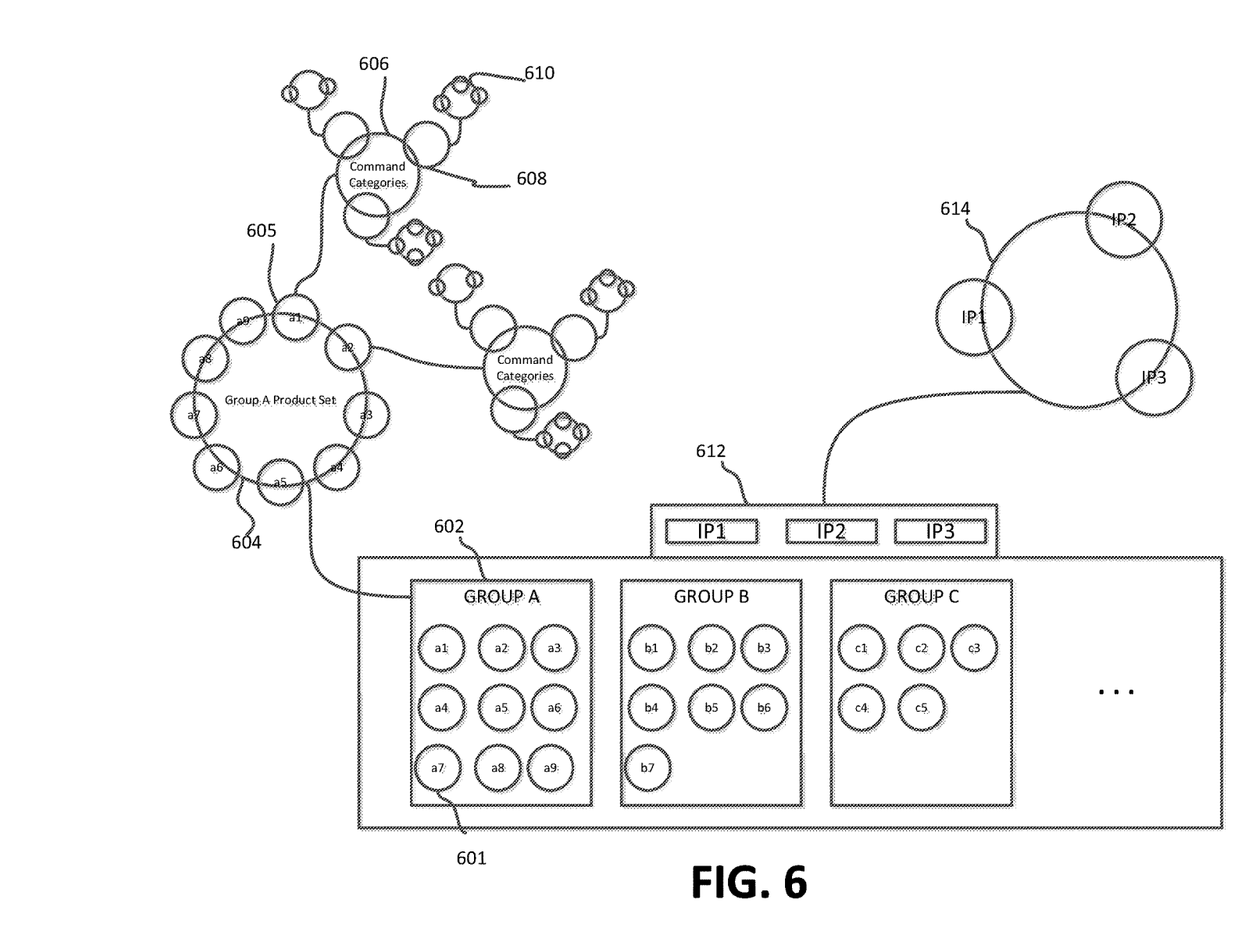
FIG. 6 is an example diagram depicting a plurality of groups, in accordance with one or more examples disclosed herein.

FIG. 6 is an example diagram 600 depicting the round robin algorithm applied to one of a plurality of groups of products. In some examples, the product may be implemented as TLDs. As shown in FIG. 6, group A 602 includes a set of products 601, including a1 ... a9. The set of products a1 ... a9 may be stored in a sequential order 604. Each of the products in the set of products has associated therewith a product category. For example, a1 605 has command categories 606 associated therewith. Each of the command categories has associated therewith command values. For example, command category 608 has command values 610 associated therewith. The command categories and command values are stored in sequential order. Network interfaces 612 are available network interfaces for communicating created requests. Network interfaces may be stored in sequential order 614. As noted above, pointers may be stored indicating the next product, command category, command value, and IP value to select in generating a monitoring transaction. Thus, where a round robin algorithm is used for selection purposes, when a monitoring transaction selects a value, the pointer may be updated to point to the next item in the sequential order.

Figure 7:
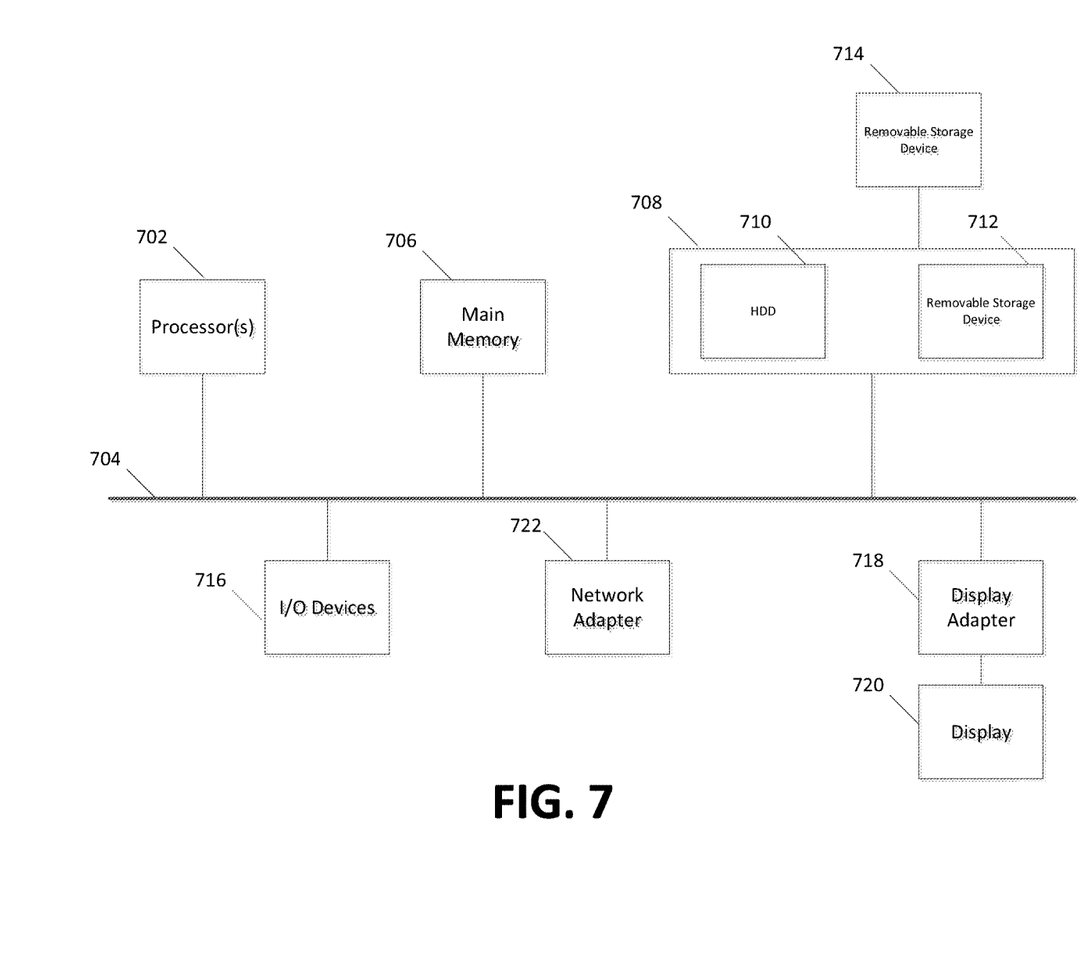
FIG. 7 is an example block diagram of a device for monitoring command performance, in accordance with one or more examples disclosed herein.

FIG. 7 illustrates a block diagram of a computing apparatus 700, such as the device 100 depicted in FIG. 1A, according to an example. In this respect, the computing apparatus 700 may be used as a platform for executing one or more of the functions described hereinabove.

The computing apparatus 700 includes one or more processors 702. The processor(s) 702 may be used to execute some or all of the steps described in the methods depicted in FIGS. 2-5. Commands and data from the processor(s) 702 are communicated over a communication bus 704. The computing apparatus 700 also includes a main memory 706, such as a random access memory (RAM), where the program code for the processor(s) 702, may be executed during runtime, and a secondary memory 708. The secondary memory 708 may includes, for example, one or more hard disk drives 710 and/or a removable storage drive 712, representing a floppy diskette drive, a magnetic tape drive, a compact disk drive, etc., where a copy of the program code in the form of computer-readable or machine-readable instructions for the grouping module 104 or 156, monitoring module 106 or 174, group information management module 176 and/or compliance module 108 or 158 to execute the methods depicted in FIGS. 2-5 may be stored. The storage device(s) as discussed herein may comprise a combination of non-transitory, volatile or nonvolatile memory such as random access memory (RAM) or read only memory (ROM).

The removable storage drive 710 may read from and/or writes to a removable storage unit 714 in a well-known manner. User input and output devices 716 may include a keyboard, a mouse, a display, etc. A display adaptor 718 may interface with the communication bus 704 and the display 720 and may receive display data from the processor(s) 702 and convert the display data into display commands for the display 720. In addition, the processor(s) 702 may communicate over a network, for instance, the Internet, LAN, etc., through a network adaptor 722.

The foregoing descriptions have been presented for purposes of illustration and description. They are not exhaustive and do not limit the disclosed examples to the precise form disclosed. Modifications and variations are possible in light of the above teachings or may be acquired from practicing the disclosed examples. For example, the described implementation includes software, but the disclosed examples may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art may appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), XML, Java, C++, JavaScript, HTML, HTML/AJAX, Flex, Silverlight, or any other now known or later created programming language. One or more of such software sections or modules can be integrated into a computer system or existing browser software.

Other examples may be apparent to those skilled in the art from consideration of the specification and practice of the examples disclosed herein. The recitations in the claims are to be interpreted broadly based on the language employed in the claims and not limited to examples described in the present specification or during the prosecution of the application, which examples are to be construed non-exclusive. It is intended, therefore, that the specification and examples be considered as example(s) only, with a true scope and spirit being indicated by the following claims and their full scope equivalents.

What is claimed is:

1. A method, comprising:
selecting a top-level domain (TLD) from a plurality of TLDs in one group of a plurality of groups of TLDs, wherein each of the plurality of groups of TLDs is associated with an attribute and a plurality of commands;
selecting a command from the plurality of commands based on the TLD that was selected, wherein the command comprises at least one of: a session command that comprises commands for a system login or a system log out, a query command that comprises commands that do not change a state of an object, or a transform command that comprises commands that do change a state of the object;
transmitting a request including the command as a provisioning protocol command with respect to the TLD;
monitoring performance of the command with respect to the TLD, wherein the performance comprises at least one of: a time duration from when a request is sent to perform an associated command value to when a response to the request is received, an availability of the TLD, or a failure response that is attributed to the TLD of the group of TLDs; and
providing an indication of the performance for determining compliance with a predetermined performance standard for the TLD.

2. The method of claim 1, further comprising:
selecting a network interface from a plurality of network interfaces to facilitate execution of the command.

3. The method of claim 1, further comprising:
determining a set of attributes;
defining the plurality of groups of TLDs based on the set of attributes; and
assigning a set of TLDs to a group in the plurality of groups of TLDs based on attributes of the set of TLDs.

4. The method of claim 3, further comprising:
determining that an attribute of a TLD in the set of TLDs has changed; and
reassigning the TLD to a different group based on the determining.

5. The method of claim 1, wherein the predetermined performance standard corresponds to a service level agreement.

6. A non-transitory computer-readable medium, storing a set of instructions, executable by a processor, to perform operations comprising:
accessing a plurality of groups of a plurality of top-level domains (TLDs), each group of the plurality of groups having associated therewith:
a set of TLDs;
an attribute of the set of TLDs; and
a plurality of command categories, each command category of the plurality of command categories including a set of commands, wherein the set of commands comprises at least one of: a session command that comprises commands for a system login or a system log out, a query command that comprises commands that do not change a state of an object, or a transform command that comprises commands that do change a state of the object;
initiating execution of commands associated with each group of the plurality of groups, wherein at least one TLD associated with each group of the plurality of groups executes commands at a time in accordance with a predetermined algorithm;
monitoring performance of the execution of the commands, wherein the performance comprises at least one of: a time duration from when a request is sent to perform a command value associated with a first command of the commands to when a response to the request is received, an availability of the at least one TLD, or a failure response that is attributed to the TLD of the group of TLDs; and
providing an indication of the performance for determining compliance of each TLD of the set of TLDs with a predetermined performance standard, wherein the compliance of each TLD of the plurality of TLDs is determined based on the compliance of at least one TLD in the same group.

7. The non-transitory computer-readable medium of claim 6, wherein the operations further comprise:
selecting a network interface from a plurality of network interfaces to facilitate execution of the set of commands.

8. The non-transitory computer-readable medium of claim 6, wherein the operations further comprise:
determining a set of attributes;
defining the plurality of groups based on the set of attributes; and
assigning a TLD to one of the plurality of groups based on attributes associated with the TLD.

9. The non-transitory computer-readable medium of claim 8, wherein the operations further comprise:
determining that an attribute of the TLD in the set of TLDs has changed; and
reassigning the TLD to a different group based on the determining.

10. The non-transitory computer-readable medium of claim 6, wherein the predetermined algorithm is a round-robin algorithm.

11. The non-transitory computer-readable medium of claim 6, wherein the predetermined performance standard corresponds to one or more service level agreements associated with the plurality of TLDs.

12. An apparatus, comprising:
a memory, storing a set of instructions; and
a processor that executes the set of instructions to perform operations comprising:
receiving performance information from a monitoring device, the performance information representing performance of a top-level domain (TLD) in a group of TLDs based a plurality of command categories, wherein the performance information comprises at least one of: a time duration from when a request is sent to perform a command value for a command to when a response to the request is received, an availability of the TLD, or a failure response that is attributed to the TLD of the group of TLDs, each command category of the plurality of command categories including a set of commands, wherein the set of commands comprises at least one of: a session command that comprises commands for a system login or a system log out, a query command that comprises commands that do not change a state of an object, or a transform command that comprises commands that do change a state of the object;
comparing the performance information with a predetermined performance standard;

determining that the performance information is not in compliance with the predetermined performance standard; and determining that the group of TLDs is not in compliance with the predetermined performance standard based on the performance information of the TLD.

13. The apparatus of claim 12, wherein the operations further comprise:

determining a set of attributes;

defining a plurality of groups based on the set of attributes; and assigning the group of TLDs to a group of the plurality of groups based on attributes of the group of TLDs.

14. The apparatus of claim 13, wherein the operations further comprise:

determining that one of the set of attributes has changed; and reassigning a TLD to a different group based on the determining.

15. The apparatus of claim 13, wherein the operations further comprise:

for each group of the plurality of groups, creating the plurality of command categories; and for each command category of the plurality of command categories, assigning a set of command values.

16. The apparatus of claim 12, wherein the operations further comprise:

initiating transmission of commands with respect to the TLD and other TLDs in the group of TLDs based on the determination that the group of TLDs is not in compliance with the predetermined performance standard; and receiving results of the transmission of commands with respect to the TLD and other TLDs.

17. The apparatus of claim 16, wherein the operations further comprise:

analyzing the results of the transmission of commands with respect to the TLD and the other TLDs;

determining that the TLD is the only TLD in the group of TLDs that is not performing in compliance with the predetermined performance standard; and isolating performance of the TLD from performances of the other TLDs in the group of TLDs.

18. The apparatus of claim 17, wherein the operations further comprise:

monitoring the performance of the TLD until the TLD complies with the predetermined performance standard; and integrating the performance of the TLD with the other TLDs in the group of TLDs when it is determined that the performance of the TLD is in compliance with the predetermined performance standard.

19. The apparatus of claim 12, wherein the predetermined performance standard correspond to a service level agreement.

* * * * *